(12) United States Patent
Kirshenbaum et al.

(10) Patent No.: US 7,805,571 B2
(45) Date of Patent: *Sep. 28, 2010

(54) USING EXTERNAL MEMORY DEVICES TO IMPROVE SYSTEM PERFORMANCE

(75) Inventors: Alexander Kirshenbaum, Redmond, WA (US); Cenk Ergan, Bellevue, WA (US); Michael R. Fortin, Redmond, WA (US); Robert L. Reinauer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/366,112

(22) Filed: Feb. 5, 2009

(65) Prior Publication Data

US 2009/0144495 A1    Jun. 4, 2009

Related U.S. Application Data

(63) Continuation of application No. 10/970,772, filed on Oct. 21, 2004, now Pat. No. 7,490,197.

(51) Int. Cl.
*G06F 12/00* (2006.01)
(52) U.S. Cl. .................. 711/115; 711/4; 711/100; 711/104; 711/105; 711/111; 711/112; 711/113; 711/114; 710/301; 710/302; 719/321; 719/325; 719/327; 709/205
(58) Field of Classification Search .............. 711/4, 711/100, 104–105, 111–113, 115; 710/301–302; 719/321, 325–327; 709/205
See application file for complete search history.

(56) References Cited

U.S. PATENT DOCUMENTS

| 5,307,497 A | | 4/1994 | Feigenbaum et al. |
| 5,524,230 A | * | 6/1996 | Sakaue et al. ............... 711/103 |
| 6,073,232 A | | 6/2000 | Kroeker et al. |
| 6,101,601 A | | 8/2000 | Matthews et al. |
| 6,209,088 B1 | | 3/2001 | Reneris |
| 6,311,232 B1 | | 10/2001 | Cagle et al. |
| 6,434,682 B1 | * | 8/2002 | Ashton et al. ............... 711/162 |

(Continued)

OTHER PUBLICATIONS

"Memory Accelerator," NewScientist.com, printed Aug. 26, 2005, http://ww.newscientist.com/article.ns?id=dn7857&feedId=online-news_rss20.

(Continued)

*Primary Examiner*—Tuan V Thai
*Assistant Examiner*—Zhuo H Li
(74) *Attorney, Agent, or Firm*—Marshall, Gerstein & Borun LLP

(57) ABSTRACT

The invention is directed towards a system and method that utilizes external memory devices to cache sectors from a rotating storage device (e.g., a hard drive) to improve system performance. When an external memory device (EMD) is plugged into the computing device or onto a network in which the computing device is connected, the system recognizes the EMD and populates the EMD with disk sectors. The system routes I/O read requests directed to the disk sector to the EMD cache instead of the actual disk sector. The use of EMDs increases performance and productivity on the computing device systems for a fraction of the cost of adding memory to the computing device.

25 Claims, 4 Drawing Sheets

U.S. PATENT DOCUMENTS

| | | |
|---|---|---|
| 7,171,532 B2 | 1/2007 | Kodama |
| 7,490,197 B2 | 2/2009 | Kirshenbaum et al. |
| 2003/0074550 A1 | 4/2003 | Wilks et al. |
| 2003/0154314 A1* | 8/2003 | Mason et al. ............... 709/250 |
| 2004/0003223 A1 | 1/2004 | Fortin et al. |
| 2004/0010639 A1 | 1/2004 | Inoue |
| 2004/0230743 A1 | 11/2004 | Ware et al. |

OTHER PUBLICATIONS

Anderson et al., "A Case for Buffer Servers," Hot Topics in Operating Systems, Procoogingn of the Seventh Workshop on Rio Rico, AZ, Mar. 29-30, 1999, XP010355835.

European Search Report for 05109295.5 mailed Jun. 8, 2007.

* cited by examiner

USING EXTERNAL MEMORY DEVICES TO IMPROVE SYSTEM PERFORMANCE

This is a continuation of U.S. application Ser. No. 10/970,772, filed Oct. 21, 2004, the entire disclosure of which is incorporated herein by reference.

FIELD OF THE INVENTION

This invention relates generally to computer systems and, more particularly, relates to improving performance of computer systems.

BACKGROUND OF THE INVENTION

Computing devices such as personal computers, game consoles, smart phones, and the like often utilize a time-consuming process in order to load and cache pages used by applications into memory. The pages are typically stored on a rotating non-volatile media such as a magnetic hard disk (e.g., a hard drive). However, the device's processor executes instructions only from addressable memory such as DRAM or some other type of volatile electronic memory. The operating systems used in the computing devices cache the pages used by applications in memory so that the applications do not need to load pages from the rotating media as frequently.

The transfer of the pages from the hard drive is slow, particularly when the application is loading a large file. This is also prevalent in restoring the computer system from hibernate mode. A significant factor in the transfer time is due to the disk drive spin up speed. A relatively small disk spinning at a relatively slow RPM requires 5 to 6 seconds to spin up and be usable. Larger disks such as multi-platter devices and those spinning at faster RPMs require 10 to 12 seconds or more to spin up.

This problem gets worse as applications grow in size to incorporate security fixes and become more reliable. These applications often require more memory to operate without having to continually transfer data to and from the rotating storage media. However, upgrading the memory of machines is often too costly to undertake for corporations and end users or is beyond the skill level of individual users. Although the cost of memory itself is low, the labor and downtime involved in physically opening each machine and adding RAM may cost several hundred dollars.

Another problem where upgrading the memory of machines is often too costly to undertake is when a system is required to occasionally execute larger and more complex applications than normal. For example, an accounting staff of a company might need to run consolidation applications a few times a month. The larger and more complex applications require more memory to operate efficiently. Although the cost of memory itself is low, the labor and downtime involved in physically opening each machine and adding RAM may cost several hundred dollars. This cost may not justify the additional memory for the few times the application is run.

BRIEF SUMMARY OF THE INVENTION

The invention is directed towards an improved memory management architecture that provides a system, method, and mechanism that utilizes external memory (volatile or non-volatile) devices to cache sectors from the hard disk (i.e., disk sectors) and/or slower memory components to improve system performance. When an external memory device (EMD) is plugged into the computing device or onto a network in which the computing device is connected, the system recognizes the EMD and populates the EMD with disk sectors and/or memory sectors. The system routes I/O read requests directed to the sector to the EMD cache instead of the actual sector. If the EMD is connected to the USB2 local bus, the access time can be twenty times faster that reading from the hard disk. The use of EMDs increases performance and productivity on the computing device systems for a fraction of the cost of adding memory to the computing device. Additionally, consumer devices such as Xbox® can run richer software with the memory of EMDs.

The system detects when an EMD is first used with respect to the computing device. The type of EMD is detected and a driver is installed that is used to cache disk sectors on the EMD. The driver uses the EMD as an asynchronous cache, caching sectors from any disk and/or slower memory device on the system. If no prior knowledge of which sectors are valuable in terms of frequent access, the system may use data on the computing machine to determine which sectors are used to populate the EMD cache. Alternatively, the system populates the EMD cache with a particular sector when that particular sector is accessed during operation. The next time that particular sector is to be accessed for a read operation, the system directs the read operation to access the copy from the EMD.

The system may track usage patterns and determine which disk sectors are most frequently accessed. On subsequent uses of the EMD, the system caches those sectors that are most frequently accessed onto the EMD. If the EMD is present when the computing device is powered up, the EMD can be pre-populated with data during start-up of the operating system.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
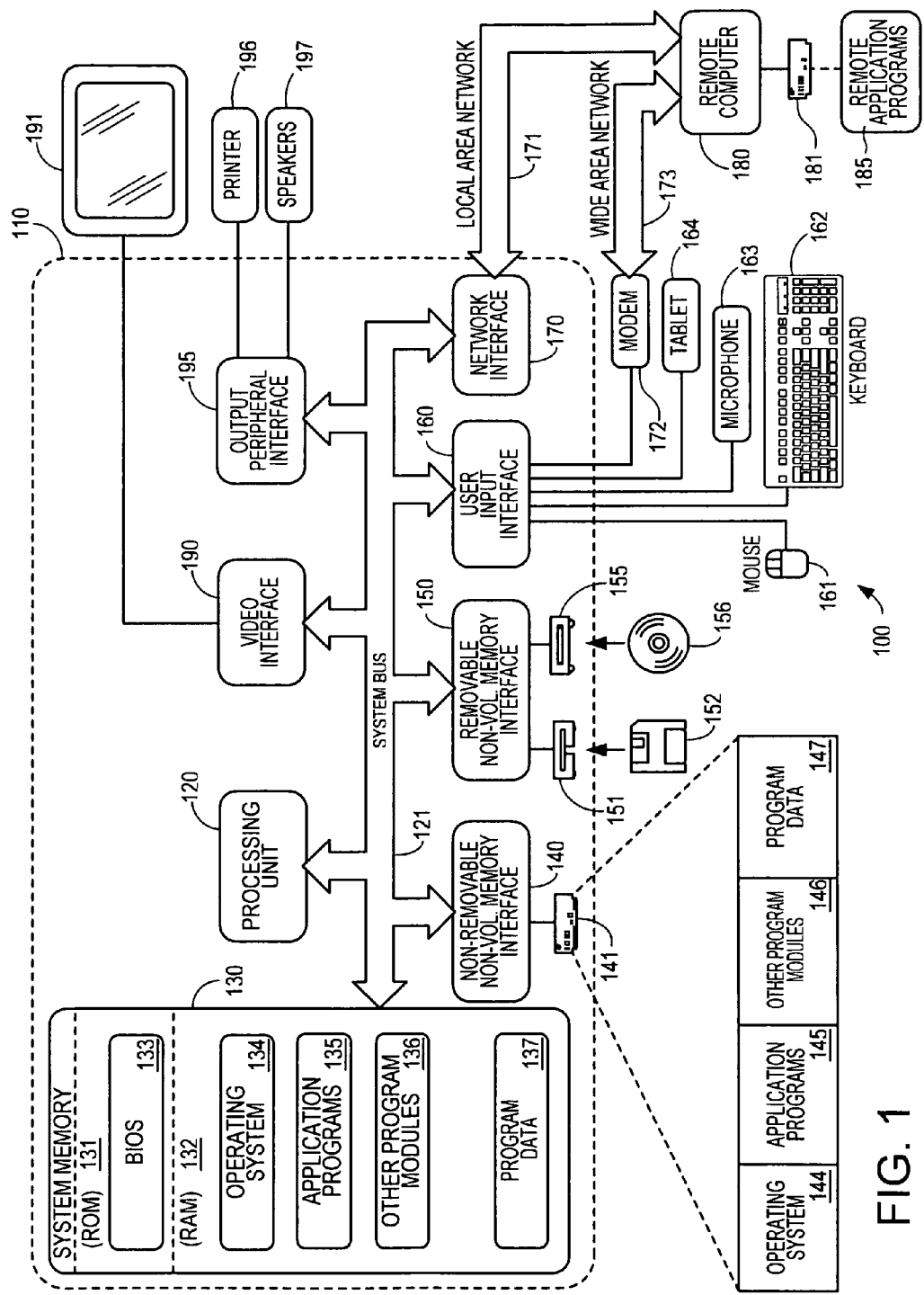
FIG. 1 is a block diagram generally illustrating an exemplary computer system on which the present invention resides.

The invention is directed towards an improved memory management architecture that provides a system, method, and mechanism that utilizes external memory (volatile or non-volatile) devices to cache sectors from the hard disk (i.e., disk sectors) or from slower memory devices to improve system performance. For example, many classes of portable computing devices have no hard drives or rotating media storage devices, but still implement hierarchical memory architectures. These portable computing devices would benefit greatly from this invention in that it would allow them to execute larger and more complex enterprise applications within the office place. With the advent of 802.11n, 200-500

Mb wireless connectivity will be available to any wireless device and the use of external memory devices and/or network based memory servers will improve system performance.

The external memory is used to cache data from devices that are generally slower in terms of accessing data such that access times for data used by applications/operating systems can be accessed quicker, thereby improving performance. For older computing devices in which adding actual RAM is too costly, the use of external memory devices will increase performance and productivity on the older devices for a fraction of the cost and enable users to reap the reliability, security, and productivity improvements of newer software applications on existing hardware. For example, consumer devices such as Xbox® benefit by running richer software in terms of improved graphics and performance. Additionally, the amount of memory required for this purpose is likely much less than the amount of memory required to update a system up to a given level.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, game consoles, smart phones, personal data assistants, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Universal Serial Bus (USB), and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data (e.g., multimedia data, audio data, video data, etc.) for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162, a pointing device 161, commonly referred to as a mouse, trackball or touch pad, a microphone 163, and a tablet or electronic digitizer 164. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
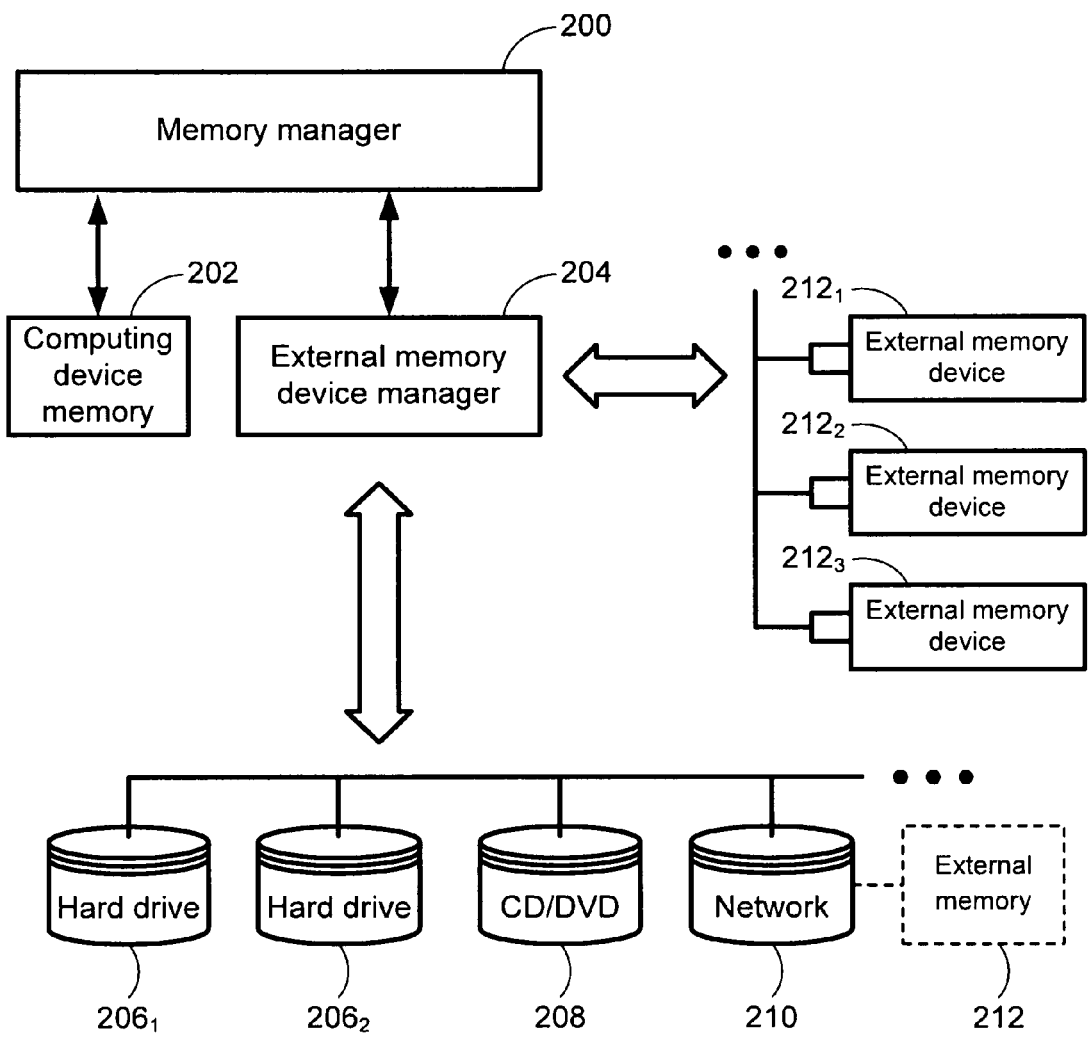
FIG. 2 is a block diagram representing a memory management architecture in accordance with an aspect of the invention.

Turning now to FIG. 2, the present invention provides a memory manager 200 controlling conventional device memory 202 and is in communication with external memory device (EMD) manager 204. The EMD manager 204 is under the memory manager 200 and above the physical hardware 206₁, 206₂, 208 and network 210. The physical hardware may be a hard drive, a multimedia drive such as a CD drive, a DVD drive, or a combination CD/DVD drive, an optical disk, etc. located locally or remotely accessible via the network. While EMD manager 204 is shown separately, it is recognized that the EMD manager 204 may be integrated with memory manager 200. EMD manager 204 detects when an external memory device (EMD) 212 is accessible via conventional methods such as plug-n-play and the like. The EMD 212 may be in the form of a removable solid state non-volatile memory device which can be plugged into the computing device, such as one according to the CompactFlash specification as maintained by the CompactFlash Association, or the like. It may also be in the form of a volatile memory device. The EMD can in fact be housed within existing externally attached products, such as a mouse, a keyboard, or a network attached device and there can be multiple such devices attached at a time. Another alternative location of the external memory device is at a remote location on network 210 or part of the network infrastructure such as memory on a server.

The present invention leverages the memory available for use in the EMD to maintain in memory the disk sectors that are likely to be used by applications and directs I/O requests that are directed to data that is in disk sectors copied into the EMD memory to be read from the EMD memory instead of the sector on disk.

Figure 3A:
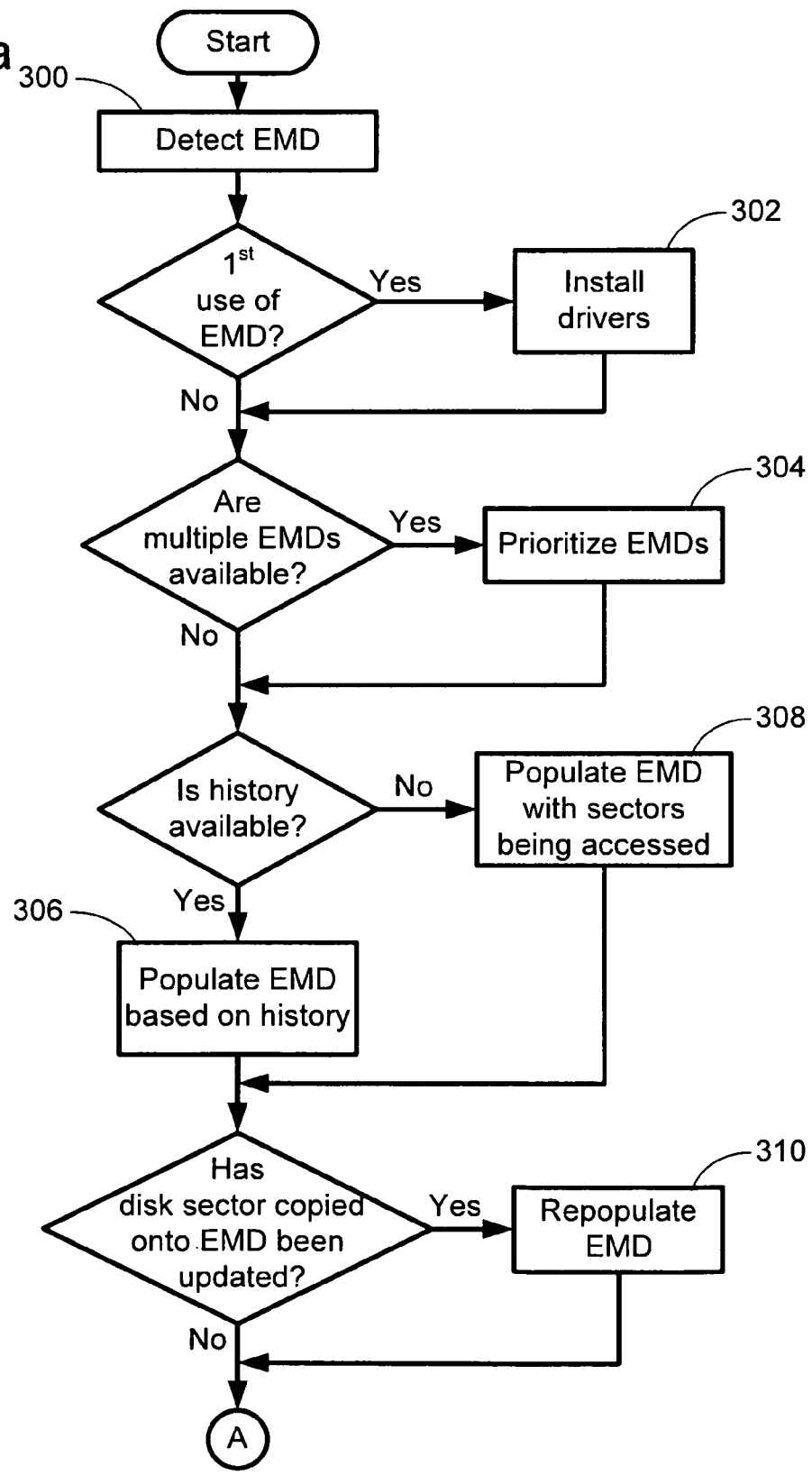
FIGS. 3a-3b are a flow chart generally illustrating the steps the invention takes in utilizing external memory devices to improve system performance.
Figure 3B:
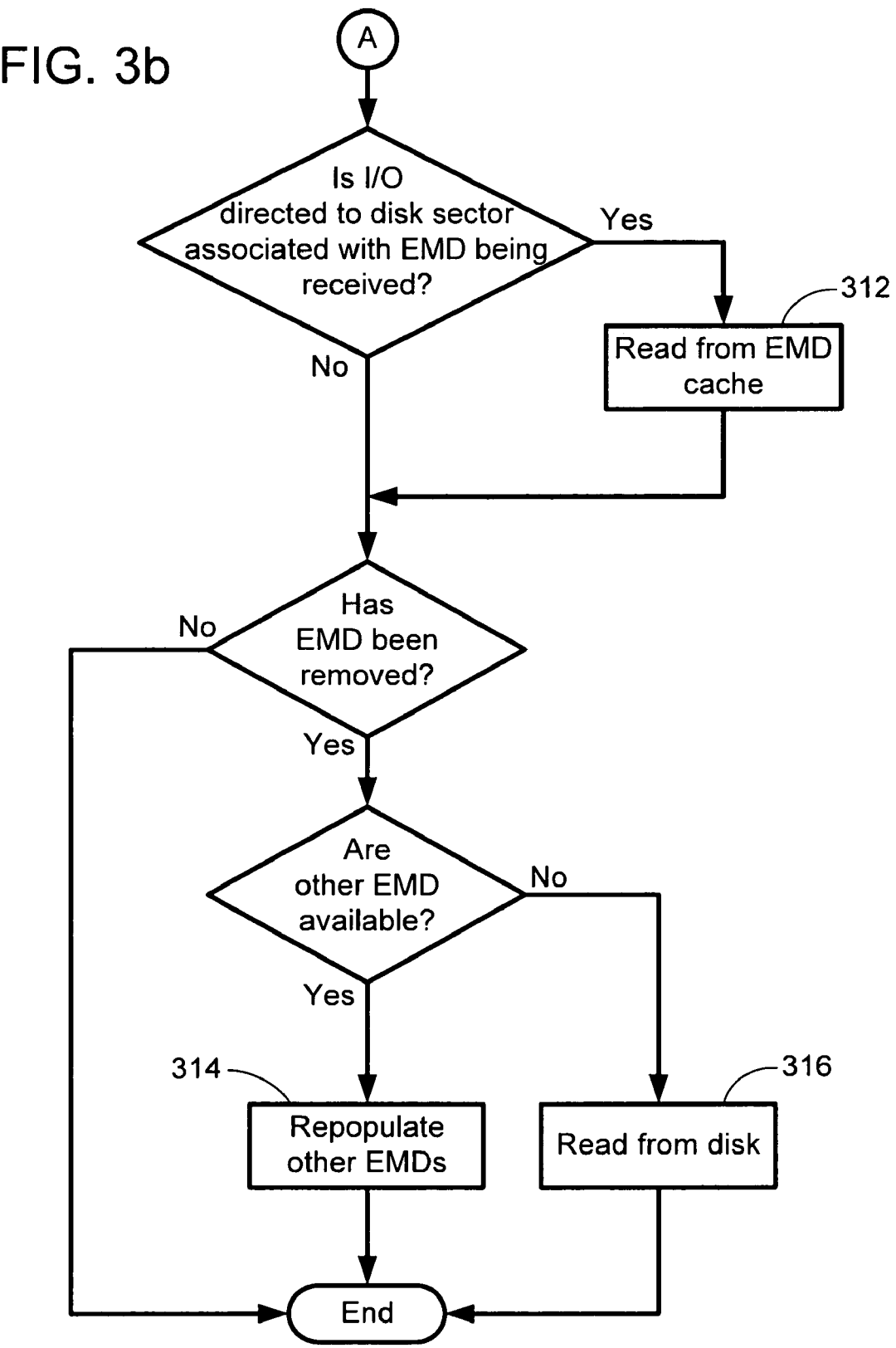

With reference to FIGS. 3a and 3b, the steps the invention performs to utilize external memory devices shall now be described. In the description that follows, the sectors used to describe the invention will reside on a hard drive 206. While the invention is being described in the foregoing context, it is not meant to be limiting as those of skill in the art will appreciate that disk sectors from other devices that require spin-up such as CD/DVD device 208 and the like may be cached on disk. The sectors that are cached may also reside on slower memory devices. While FIGS. 3a and 3b show steps serially, it should be understood that the steps may be taken in different order and/or in parallel. EMD manager 204 detects when an EMD 212 is available (step 300). One approach to detect an EMD is the detection interface described in U.S. patent application Ser. No. 10/837,986, filed May 3, 2004, entitled "Non-Volatile Memory Cache Performance Improvement", hereby incorporated by reference in its entirety. Other methods may be used such as conventional plug and play methods. The size and type of memory available in the EMD 212 is determined. If the EMD 212 is being used for the first time in the computing device, a driver for the EMD 212 is installed (step 302). The driver is used to communicate with the EMD 212 and uses the EMD as an asynchronous block cache to cache sectors from disks 206 on the system. The updating of the cache is asynchronous in the event that the EMD may be slow and waiting for it to be updated can result in increased latency for the original read request.

If other EMDs are available for use, the system prioritizes how the EMDS will be populated by caching disk sectors that are more likely to be used on EMDs that have better bandwidth and latency in comparison to other available EMDs (step 304). Some computing devices keep track of disk usage such as which disk sectors are most frequently accessed by the operating system and by applications, last access times, access patterns, access frequency, and the like. If this history is available, the EMD is populated based on the history (step 306). If the history is not available, the EMD is populated with the disk sectors being accessed by the applications (or computing device) during the time the application is reading from disk (step 308). Note that the EMD may be populated in the format required by the EMD. The usage information (i.e., history) of disk sectors is tracked to determine which sectors should be mirrored onto the EMD the next time the EMD is available for use. The algorithms used are similar to the algorithms used to proactively manage page memory as described in U.S. patent application Ser. No. 10/325,591, filed Dec. 20, 2002, entitled "Methods and Mechanisms for Proactive Memory Management," which is hereby incorporated by reference in its entirety. The difference is that instead of determining which pages in memory are useful to cache, the present invention determines which disk sectors are useful to cache.

In one embodiment wherein the computing device is in a networked system, a network server retains information about the computing device and employs remote algorithms that assist the EMD manager 204 in the management of local memory for the computing device. This embodiment is particularly suitable for low-end clients that don't have the memory or computer power to determine which disk sectors should be cached. The remote algorithms perform a detailed analysis on data patterns, access patterns, etc. on the client and produce more optimum results than the low-end client could produce.

During operation, an application or the computing device may write to a disk sector that is copied to an EMD. The EMD is never written to by the application or computing device. Instead, the write operation is applied to the disk sector. After the write operation is completed, the disk sector is copied back onto the EMD (step 310). This approach is used so that if the EMD is removed, no data is lost such as would be the case in a remote file system when the link to the remote file system is not operable; instead, the computing device reads from disk instead of the EMD. As a result, the invention is more resistant to connectivity issues such as lost connections, removal of EMDs, etc.

Whenever an I/O read request is received, EMD manager 204 checks to see if the request is directed to a disk sector that has been copied to the memory of an EMD 212. If the read request is directed to a disk sector that has been copied to the memory of an EMD, the EMD manager 204 redirects the read request to the EMD (step 312). The result is that the read request is completed faster than if the read request was completed at the hard disk 206.

An EMD 212 can be removed by a user at any time. When an EMD is removed, the system detects the removal. If other EMDs are available, the remaining EMDs are repopulated (step 314) if the EMD that was removed was not the slowest EMD available. If other EMDs are not available (or if the EMD that was removed was the slowest EMD), data is read from the hard disk (step 316). Steps 300 to 316 are repeated whenever an EMD is added or removed and steps 310 and 312 are repeated for as long as an EMD is available for use.

Note that if the EMD is non-volatile, the EMD memory can be pre-populated with sectors having configuration data during power down or when hibernating. During power-up or restoration, the contents of the EMD can be read while the disk is spinning up. The use of this technique can decrease the boot time and the hibernate awaken time of a computer system. Further details can be found in U.S. patent application Ser. No. 10/186,164, filed Jun. 27, 2002, entitled "Apparatus and Method to Decrease Boot Time and Hibernate Awaken Time of a Computer System," hereby incorporated by reference in its entirety.

Now that the overall steps have been described, the performance improvements shall be discussed. The key factors that determine the performance improvements that can be expected from external memory devices are the transfer latency and throughput for the EMD and its bus (e.g. USB1/2, PCMCIA, Ethernet 100 BaseT, etc.), the size of the external memory, the policies used in managing the cache, and the scenarios and workloads of how the external memory is used.

The transfer latency and throughput for the most typical busses EMD may be plugged in varies. It is expected that the bus becomes the primary bottleneck for most operations if the EMD consists of regular RAM packaged as a device that can be plugged into the particular bus. The bus latency and throughput for USB1, USB2 and PCI/PCMCIA is estimated by issuing unbuffered disk I/Os of increasing sizes (4 KB, 8 KB, 16 KB, 32 KB and 64 KB) that should hit the track buffer (which is typically regular memory) of the disk plugged into that bus. The following values of Table 1 were derived by simply fitting a line to the times it took to transfer the I/O sizes.

TABLE 1

| Bus Type | Setup Time (us) | Time to Transfer each KB after Setup (us) | Total Time to Transfer 4 KB (us) |
| --- | --- | --- | --- |
| PCI/PCMCIA (Cardbus) | 100 | 15 | 160 |
| USB 2 | 400 | 30 | 520 |
| USB 1 | 4000 | 1000 | 8000 |

In order to be meaningful as a disk cache, copying data from the EMD must be faster than going to the disk for it. A 4 KB random disk I/O that involves a seek takes anywhere from 5-15 ms on typical desktop and laptop disks. Assume that it takes 10 ms for a 4 KB disk I/O with seek, data could have been retrieved 60× faster from an EMD cache on PCMCIA, or 20× faster from an EMD on USB2. Overall, USB2 seems to be a very suitable bus for plugging in EMDs.

It should be noted that one issue with USB1 is that the 4 ms setup times would make any performance gains unlikely. This can be worked around by always keeping an isochronous transfer channel open. Obtaining 4 KBs from an EMD on USB 1 would then be typically twice as fast then obtaining it from a disk with a seek. Due to the low throughput rate over USB 1, it would still be faster to go to the disk for 16 KB, 32 KB and 64 KB I/Os that are typically seen on client systems.

However, a USB 1 cache used only for the pagefile and file system metadata which is typically accessed with 4 KB random I/Os can still deliver a performance boost.

USB 2 adoption started only after service pack 1 of Windows XP® was released. Most of the 64 MB and 128 MB systems that would benefit most from EMD will not typically have USB 2. However, these systems usually do have a 100 BaseT Ethernet network cards. Transfer times of 10 MB/s would be sufficient for significant performance gains from an EMD. An EMD could be attached as a pass through network device per computer, or could even be pushed into the network switches to improve the performance of a small network of computers. Going beyond the switch introduces many reliability and security issues due to shared network bandwidth, but could be done.

As with any cache, the actual policies used in managing which data to keep in the cache is a big factor in determining the resulting performance gains. If an EMD is used as a block cache for underlying disks and other devices, the EMD cache can be populated when reads from the underlying device completes, as well as when writes are issued from applications and file systems. As previously described, the data in the EMD cache will need to be updated asynchronously in order to avoid increasing the time of the original device requests. If a request comes for a range that is being asynchronously updated, it can simply be passed down to the underlying device. If the asynchronous update is outstanding, there must have been a very recent request for the same range that initiated the update, and the data for the range is likely to be cached at the device (e.g. track buffer) or controller.

Typically block caches are managed with an LRU algorithm. In the algorithm, the referenced blocks are put to the end of the LRU list whenever a read request hits or misses the cache. When a block that is not in the cache is read or written to, blocks from the front of the LRU list are repurposed to cache the contents of the new blocks. As a result, LRU algorithms are prone to erosion because valuable blocks in the cache are churned through over time. Algorithms such as those that break the list to multiple prioritized sub-lists and maintain richer use history beyond the last access time will be more resilient.

On Windows NT, caching of file and page data is done by the memory manager via a standby page list. File systems, registry and other system components use the file object/mapping mechanisms to cache their data at the same level through the memory and cache manager. If another cache is put at any other level, it results in double caching of the data. This holds true for EMD caches as well. In order to avoid this, the memory manager of the present invention can be extended to push less valuable standby list pages to the slower external memory devices. Whenever those pages are accessed, the memory manager can allocate physical memory pages and copy the data back from the external memory device. The EMD memory manager and an associated cache manager can use page priority hints that U.S. patent application Ser. No. 10/325,591 provides for a proactive and resilient management of the unified cache of pages. Since this will require kernel memory manager changes, any EMD solutions built for Windows XP are likely to suffer from double caching of the data. Simulations show that in spite of the double caching, substantial performance gains are still possible.

Another important parameter for caching is the block size and the amount of clustering and read-ahead. Whenever there is a miss in the cache, even if a smaller amount of data is requested, one needs to read at least a block size of data from the underlying disk or device and possibly even cluster more blocks around the requested offset. Clustering may eliminate future seeks back to the same position on the disk. However, it may also increase the completion time of the original request and even cause more churn in the LRU list as more blocks are referenced for each request. Further, read ahead may be queued to get even more consecutive data from the disk while it is efficient to do so, without impacting the time for the original request. However, this may result in increasing the latency for a subsequent request that needs to seek to somewhere else on the device.

It should be noted that the list of device locations that are deemed valuable by the cache can be persisted across power transitions such as boot or even periods of intense use that purge the regular contents of the cache. This list can be used to repopulate the cache contents after such a transition with proper prioritization support for background I/O.

As with any performance analysis, it is crucial to look at representative scenarios and workloads to getting meaningful and useful data. In order to characterize the performance improvements that can be expected from EMD caches on existing Windows (XP & 2000), experiments with simple LRU write-through block caching at the disk level were performed. As discussed above, this will suffer from double caching of the data. However, these experiments are easier to emulate, simulate and actually build such EMD caches and measure their impact. Results show that even such a simple cache can have a big impact on disk and system performance. Integration with the computing device's memory manager and using a smarter policy would further increase the gains.

Since the experiment basically caches for the disk accesses, the success of the cache can be measured by comparing the overall time for the playback of the same set of disk accesses that are captured from a representative workload or scenario, without the cache and with various configurations of the cache. In most client scenarios, reductions in disk read times result in a proportional increase in responsiveness or benchmark scores.

In order to determine the real world impact of an EMD cache, two scenarios were looked at. One used disk traces captured from real end-user systems over hours on 128 MB and 256 MB systems. Another used disk traces from industry benchmarks such as Business Winstone 2001, Content Creation Winstone 2002, and a modified version of Business Winstone that uses Office 2003 applications. Traces were obtained at multiple memory sizes, so the gains could be compared from a simple EMD cache to actually increasing the system memory size.

EMD devices can be accurately emulated by using a regular block cache and adding a delay to cache hits based on the desired EMD bus. After copying the requested bytes from memory, one can determine the transfer time that is calculated for the desired EMD bus based on the setup time and throughput values such as the ones in Table 1.

The procedure for this evaluation is to: configure the target system to run at the target memory size with /maxmem boot.ini switch; run the typical use scenario or an industry benchmark and trace the generated disk I/Os; configure the block cache with the desired parameters for the cache size and throughput/latency for the EMD device; replay the traced disk I/Os and capture the resulting disk I/Os due to cache misses; and compare the times and disk accesses for the two runs.

Ideally the scenarios should be run with the appropriately configured block cache and the end results (response times or benchmark scores) compared. However, if the link between disk times and the end results is already established, simply playing back the captured disk I/Os consume less time for the numerous EMD configurations that need to be evaluated. A simple simulator was used to roughly estimate the potential gains from an EMD cache. This allowed the processing of hours-long disk traces from 128 MB customer systems as well as from internal development systems and measure the impact of various configurations of EMD caches. In order to simplify things further, we focused on the time it took the disk to process the reads and ignored the disk write times. Representative seek times were determined by ignoring seek times smaller than 2 ms and larger than 20 ms. The last couple positions of the disk head were tracked to simulate "track buffering." In spite of the complications above, the disk simulation is typically within an acceptable range: 75% of the predictions are within 15% of the actual times. Any misprediction is typically due to the conservative simulation and prediction of higher disk read times. Even though the disk simulator may not always accurately capture the performance characteristics of a disk in a specific trace, its own performance characteristics are representative and typical of an actual desktop/laptop disk.

Table 2 shows the reduction in disk read times in EMD cache simulation of disk traces that were acquired during actual use of various computing systems over hours of operation.

TABLE 2

Gains from EMD cache for actual end-user use of systems

| System | Simulated Disk Read Time (sec) | Simulated Disk Read Time % with a USB2 EMD Cache of Size | | | | | |
|---|---|---|---|---|---|---|---|
| | | 0 MB | 32 MB | 64 MB | 128 MB | 256 MB | 512 MB |
| System 1 (128 MB) | 1259 | 100% | 89% | 70% | 37% | 18% | 18% |
| System 2 (128 MB) | 1011 | 100% | 90% | 70% | 38% | 22% | 22% |
| System 3 (128 MB) | 2158 | 100% | 88% | 72% | 44% | 25% | 20% |
| System 4 (128 MB) | 866 | 100% | 90% | 80% | 63% | 48% | 37% |
| System 5 (256 MB) | 1747 | 100% | 92% | 85% | 70% | 52% | 40% |
| System 6 (256 MB) | 2187 | 100% | 94% | 87% | 76% | 66% | 57% |

As an example of how to interpret data from Table 2, consider system 1: a 128 MB USB2 EMD device will result in 37% of the disk read time that the current user is experiencing (i.e., a 63% reduction).

Systems 1 and 2 are from a corporation that wanted to upgrade to Windows XP, Office 2003 and latest SMS on their 128 MB systems, but hit significant slowdowns when running their line of business software. The system 3 trace is from a laptop. It can be seen that the largest improvements in these systems are systems with slower disks and only 128 MB of memory.

The bottom three systems (systems 4, 5, and 6) are developer systems on which heavy weight development tasks including building, syncing & processing of large files were performed. These systems have faster disks and the most disk I/Os generated by these tasks are sequential and do not benefit from a simple LRU block cache as much because they do not re-access the same sectors on the disk many times (e.g. syncing). Thus the overall disk time is not as representative of the end user responsiveness. The cache may have reduced the time for UI blocking disk reads significantly.

Table 3 shows the reduction in disk read times in EMD cache simulation of disk traces that were acquired during Content Creation Winstone 2002.

TABLE 3

Gains from EMD cache for Content Creation Winstone 2002

| System | Simulated Disk Read Time (s) | Simulated Disk Read Time % with a USB2 EMD Cache of Size | | | | | |
|---|---|---|---|---|---|---|---|
| | | 0 MB | 32 MB | 64 MB | 128 MB | 256 MB | 512 MB |
| Laptop150 (128 MB) | 241 | 100% | 88% | 76% | 62% | 46% | 39% |
| Laptop154 (128 MB) | 172 | 100% | 89% | 76% | 63% | 46% | 40% |
| Desktop100 (128 MB) | 173 | 100% | 90% | 78% | 65% | 46% | 40% |
| Desktop949 (128 MB) | 142 | 100% | 89% | 79% | 67% | 48% | 42% |
| Laptop150 (256 MB) | 64 | 100% | 93% | 86% | 72% | 55% | 54% |
| Laptop154 (256 MB) | 55 | 100% | 90% | 84% | 70% | 56% | 56% |
| Desktop100 (256 MB) | 47 | 100% | 95% | 87% | 76% | 60% | 59% |
| Desktop949 (256 MB) | 34 | 100% | 94% | 88% | 80% | 70% | 70% |

Table 4 shows the reduction in disk read times in EMD cache simulation of disk traces that were acquired during Business Winstone 2001.

TABLE 4

Gains from EMD cache for Business Winstone 2001

| System | Simulated Disk Read Time (s) | Simulated Disk Read Time % with a USB2 EMD Cache of Size | | | | |
|---|---|---|---|---|---|---|
| | | 0 MB | 32 MB | 64 MB | 128 MB | 256 MB | 512 MB |
| Laptop150 (128 MB) | 176 | 100% | 84% | 75% | 60% | 41% | 37% |
| Laptop159 (128 MB) | 226 | 100% | 88% | 76% | 60% | 42% | 37% |
| Desktop094 (128 MB) | 90 | 100% | 90% | 83% | 71% | 54% | 52% |
| Desktop211 (128 MB) | 83 | 100% | 91% | 84% | 72% | 59% | 57% |
| Laptop150 (256 MB) | 93 | 100% | 82% | 79% | 67% | 56% | 55% |
| Laptop159 (256 MB) | 76 | 100% | 87% | 86% | 76% | 69% | 69% |
| Desktop211 (256 MB) | 40 | 100% | 94% | 92% | 85% | 79% | 78% |
| Desktop094 (256 MB) | 40 | 100% | 95% | 93% | 85% | 80% | 79% |

As in previous cases, the improvements seen on systems with 128 MB and slower disks are the largest. Business Winstone 2001 starts to mostly fit in memory in 256 MBs, so the overall disk times and the gains from EMD are smaller in this system memory size.

Table 5 compares the gains from adding EMD cache to a system to actually adding more physical memory when running Content Creation Winstone 2002. As previously noted, the EMD cache simulation suffers from double caching of the data and is managed with a simple LRU policy. Typically adding more physical memory to the system will deliver better performance in a bigger number of scenarios. On the other hand, if the EMD cache can be integrated with the memory manager and managed with the same advanced algorithms that U.S. patent application Ser. No. 10/325,591 can provide, it can deliver performance gains comparable to adding actual memory to the system.

TABLE 5

Comparison of gains from USB2 EMD cache and actual increase in system memory

| System & Memory Size | Simulated Disk Read Time (s) with USB2 EMD Cache of Size | | | | | |
|---|---|---|---|---|---|---|
| | 0 MB | 32 MB | 64 MB | 128 MB | 256 MB | 512 MB |
| Laptop150 (128 MB) | 266 | 212 | 184 | 149 | 110 | 93 |
| Laptop150 (256 MB) | 76 | 60 | 56 | 46 | 35 | 35 |
| Laptop150 (512 MB) | 27 | 24 | 23 | 21 | 21 | 20 |

From the foregoing, it can be seen that a system and method to improve the performance of a computing device using external memory has been described. The invention allows legacy computing devices and other devices with low amounts of memory to effectively upgrade the memory without having to physically open the device. Productivity gains in terms of faster and more reliable performance can be achieved using the external memory. Sectors from rotating storage media and slower memory devices are asynchronously cached in the external memory. Unlike remote file systems, data is not lost if the external memory is removed as the data is still on the rotating storage media or slower memory devices.

All of the references cited herein, including patents, patent applications, and publications, are hereby incorporated in their entireties by reference. The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. For example, the Windows® operating system was referenced to describe the invention. Those skilled in the art will recognize that the invention may be implemented on other operating systems such as Linux, SunOs, and the like. No language in the specification should be construed as indicating any non-claimed element as essential to the practice of the invention.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method to utilize an external memory device to improve performance of a computing device having a rotating storage device comprising:
   detecting when the external memory device is available for use by the computing device, wherein the external memory device comprises a plurality of external memory devices;
   populating a particular external memory device from the plurality of the external memory devices with a copy of a sector of the rotating storage device, wherein the particular external memory device has at least one of a higher bandwidth or a lesser latency than another external memory device from the plurality of external memory devices; and
   redirecting an I/O read request from the computing device or an application for data that is stored on the sector to be read from the external memory device transparently to the computing device or the application,
wherein a time to read data from the copy of the sector populated on the external memory device is less than a time to read the data from the sector of the rotating storage device.

2. The method of claim 1 wherein populating the external memory device with the copy of the sector from the rotating storage device comprises caching the copy of the sector from the rotating storage device at the external memory device.

3. The method of claim 1 wherein populating the external memory device with the copy of the sector from the rotating storage device comprises:
detecting if a history of usage is available;
when the history of usage is available, populating the external memory device with a copy of a sector indicated by the history of usage as being likely to be used; and
when the history of usage is unavailable, populating the external memory device with a copy of a sector being accessed by the computing device or the application.

4. The method of claim 1, wherein detecting when the external memory device is available comprises detecting when the external memory device is directly received by a port of the computing device and available.

5. The method of claim 1 further comprising the step of installing a driver for the external memory device, the driver enabled to populate the external memory device with the copy of the sector.

6. The method of claim 1 further comprising the steps of:
detecting when a write operation is directed to a sector of the rotating storage device that has been copied on the external memory device;
instantiating the write operation on the sector of the rotating storage device;
copying the sector onto the external memory device after the write operation has been completed.

7. The method of claim 1 further comprising the steps of:
detecting when the external memory device is no longer available for use by the computing device; and
directing an I/O read request for the data on a sector that was copied onto the external memory device to be read from the rotating storage device.

8. The method of claim 1, wherein the external memory device comprises a plurality of external memory device, the method further comprising the steps of:
detecting when one of the external memory devices is no longer available for use by the computing device; and
repopulating the remaining external memory devices with the copy of the sector from the rotating storage device if the one of the external memory devices is not a slowest external memory device of the plurality of external memory devices or if the remaining external memory devices are unavailable.

9. The method of claim 1, further comprising:
detecting when the computing device is powering down or entering hibernation;
copying sectors having configuration data into the external memory device; and
initializing the configuration data in the external memory device into system memory while the rotating storage device is spinning up during at least one of a boot of the computing device or a resumption of the computing device from hibernation.

10. The method of claim 9, further comprising after the boot of the computing device or the resumption of the computing device from hibernation, redirecting an I/O read request from the computing device or the application for the data that is stored on the sector to be read from the external memory device.

11. A system for utilizing an external memory device to improve performance of a computing device having a rotating storage device comprising:
an external memory device manager module in communication with a memory manager of the computing device and the rotating storage device, the external memory device manager module having at least one computer readable storage medium having computer executable instructions for performing the steps of:
detecting when the external memory device is available for use by the computing device, wherein the external memory device comprises a plurality of external memory devices;
populating a particular external memory device from the plurality of the external memory devices with a copy of a sector of the rotating storage device, wherein the particular external memory device has at least one of a higher bandwidth or a lesser latency than another external memory device from the plurality of external memory devices;
when a time to read data from the copy of the sector populated on the external memory device is less than a time to read data from the sector of the rotating storage device, redirecting an I/O read request from the computing device or an application for the data that is stored on the sector of the rotating storage device to be read from the external memory device; and
when the time to read the data from the copy of the sector populated on the external memory device is greater than the time to read the data from the sector of the rotating storage device, directing the I/O read request from the computing device or the application to the rotating storage device instead of the external memory device.

12. The system of claim 11, wherein the computer executable instructions for performing the step of populating the external memory device with the copy of the sector from the rotating storage device comprises computer executable instructions for performing the steps of:
detecting if a history of usage is available; and
populating the external memory device with a copy of a sector indicated by the history as being likely to be used.

13. The system of claim 11, wherein the external memory device is directly received at a port of the computing device.

14. The system of claim 11, wherein the external memory device is remotely connected to the system.

15. The system of claim 11, wherein the rotating storage device comprises at least one of a hard drive and a multimedia drive.

16. The system of claim 11, wherein the external memory device manager module has a first computer readable storage medium having computer executable instructions executable by the computing device and a second computer readable storage medium having computer executable instructions executable by server in communication with the computing device via a network.

17. The system of claim 11, wherein the computer executable instructions for performing the step of populating the external memory device with the copy of the sector from the rotating storage device comprises computer executable instructions for performing a step of caching the copy of the sector from the rotating storage device at the external memory device.

18. A computer readable storage medium having computer executable instructions for performing the steps of:

detecting when the external memory device is available for use by the computing device, wherein the external memory device comprises a plurality of external memory devices;

populating a particular external memory device from the plurality of the external memory devices with a copy of a sector of the rotating storage device, wherein the particular external memory device has at least one of a higher bandwidth or a lesser latency than another external memory device from the plurality of external memory devices;

when a time to read data from the copy of the sector populated on the external memory device is less than a time to read data from the sector of the rotating storage device, redirecting an I/O read request from the computing device or an application for the data that is stored on the sector to be read from the external memory device transparently to the computing device or the application; and when the time to read the data from the copy of the sector populated on the external memory device is greater than the time to read the data from the sector of the rotating storage device, directing the I/O read request from the computing device or the application to the rotating storage device instead of the external memory device.

19. The computer readable storage medium of claim 18, wherein the computer executable instructions for performing the step of detecting when the external memory device is available for use by the computing device comprises computer executable instructions for performing a step of detecting when the external memory device is directly received into a port of the computing device.

20. The computer readable storage medium of claim 18 having further computer executable instructions for performing a step of installing a driver for the external memory device, the driver enabled to asynchronously populate the external memory device with a copy of a plurality of sectors from the rotating storage device.

21. The computer readable storage medium of claim 18 having further computer executable instructions for performing steps of:

detecting when a write operation is directed to a sector of the rotating storage device that has been copied on the external memory device;

instantiating the write operation on the sector of the rotating storage device;

copying the sector onto the external memory device after the write operation has been completed.

22. The computer readable storage medium of claim 18 having further computer executable instructions for performing steps of:

detecting when the external memory device is no longer available for use by the computing device; and directing an I/O read request from the computing device or an application for the data on a sector that was copied onto the external memory device to be read from the rotating storage device.

23. The computer readable storage medium of claim 18, wherein the computer executable instructions for populating the external memory device with a sector from the rotating storage device comprises computer executable instructions for performing the steps of:

predicting which sectors are likely to be accessed; and
populating the external memory device with sectors that are likely to be accessed.

24. The computer readable storage medium of claim 18, having further computer executable instructions for performing the steps of:

detecting when the computing device is powering down or entering hibernation;

copying sectors having configuration data into the external memory device; and initializing the configuration data in the external memory device into system memory while the rotating storage device is spinning up during at least one of a boot of the computing device or a resumption of the computing device from hibernation.

25. The computer readable storage medium of claim 24, wherein the configuration data has an initialization time that is approximately equal to a spin-up time of the rotating storage device.

* * * * *